(12) United States Patent
Saitou et al.

(10) Patent No.: US 12,472,902 B2
(45) Date of Patent: Nov. 18, 2025

(54) ELECTRONIC KEY FOR VEHICLE

(71) Applicant: SUBARU CORPORATION, Tokyo (JP)

(72) Inventors: Koutarou Saitou, Tokyo (JP); Hiroshi Nomura, Tokyo (JP); Keita Nakahashi, Tokyo (JP); Norihiro Arai, Tokyo (JP); Junichi Iizuka, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 4 days.

(21) Appl. No.: 18/760,412

(22) Filed: Jul. 1, 2024

(65) Prior Publication Data

US 2025/0018897 A1 Jan. 16, 2025

(30) Foreign Application Priority Data

Jul. 11, 2023 (JP) ................................ 2023-113654

(51) Int. Cl.
*B60R 25/24* (2013.01)
(52) U.S. Cl.
CPC .................................. *B60R 25/24* (2013.01)
(58) Field of Classification Search
CPC ....................................................... B60R 25/24
See application file for complete search history.

(56) References Cited

U.S. PATENT DOCUMENTS

| | | | |
|---|---|---|---|
| 8,188,838 B2* | 5/2012 | Choi | E05B 19/04 340/539.11 |
| 8,352,042 B2* | 1/2013 | Das | G08C 17/02 604/890.1 |
| 9,968,165 B1* | 5/2018 | Ramadhan | E05B 13/00 |
| 10,248,900 B2* | 4/2019 | Benkley, III | G06K 19/07354 |
| 2006/0279543 A1* | 12/2006 | Koskinen | G06F 3/0338 345/161 |
| 2007/0161410 A1* | 7/2007 | Huang | H04M 1/66 455/565 |
| 2008/0129448 A1* | 6/2008 | Reichling | G08C 17/02 340/5.72 |

FOREIGN PATENT DOCUMENTS

JP 2003-64918 A 3/2003

* cited by examiner

*Primary Examiner* — Thomas D Alunkal
(74) *Attorney, Agent, or Firm* — Rimon P.C.

(57) ABSTRACT

An electronic key for a vehicle includes an operation button, an operation signal transmitter, a light emitter, a light receiver, and a processor. The operation button is configured to perform a door locking and a door unlocking of the vehicle. The operation signal transmitter is configured to transmit an operation signal, based on an operation performed on the operation button. The light emitter is configured to output light, in response to the operation of the operation button. The light receiver is configured to receive reflection light of the light outputted from the light emitter. The processor is configured to refrain from causing the operation signal transmitter to transmit the operation signal that is based on the operation of the operation button, when the light receiver receives the reflection light.

4 Claims, 6 Drawing Sheets

ELECTRONIC KEY FOR VEHICLE

CROSS-REFERENCE TO RELATED APPLICATIONS

The present application claims priority from Japanese Patent Application No. 2023-113654 filed on Jul. 11, 2023, the entire contents of which are hereby incorporated by reference.

BACKGROUND

The disclosure relates to an electronic key for a vehicle.

Japanese Unexamined Patent Application Publication (JP-A) No. 2003-64918 discloses a keyless entry system for a vehicle which prevents a door locking and a door unlocking of the vehicle resulting from an erroneous operation of an operation button of an electronic key for the vehicle.

To prevent in advance the erroneous operation of the operation button, JP-A No. 2003-64918 allows a mode to be switched to a transmission stop mode that stops transmission of an operation signal adapted to perform the door locking and the door unlocking of the vehicle, in response to a simultaneous pressing operation or a substantially simultaneous pressing operation of a locking operation button and a unlocking operation button of the electronic key for the vehicle. The transmission stop mode is cancelled by performing the simultaneous pressing operation or the substantially simultaneous pressing operation of the locking operation button and the unlocking operation button again.

SUMMARY

An aspect of the disclosure provides an electronic key for a vehicle. The electronic key includes an operation button, an operation signal transmitter, a light emitter, a light receiver, and a processor. The operation button is configured to perform a door locking and a door unlocking of the vehicle. The operation signal transmitter is configured to transmit an operation signal, based on an operation performed on the operation button. The light emitter is configured to output light, in response to the operation of the operation button. The light receiver is configured to receive reflection light of the light outputted from the light emitter. The processor is configured to refrain from causing the operation signal transmitter to transmit the operation signal that is based on the operation of the operation button, when the light receiver receives the reflection light.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
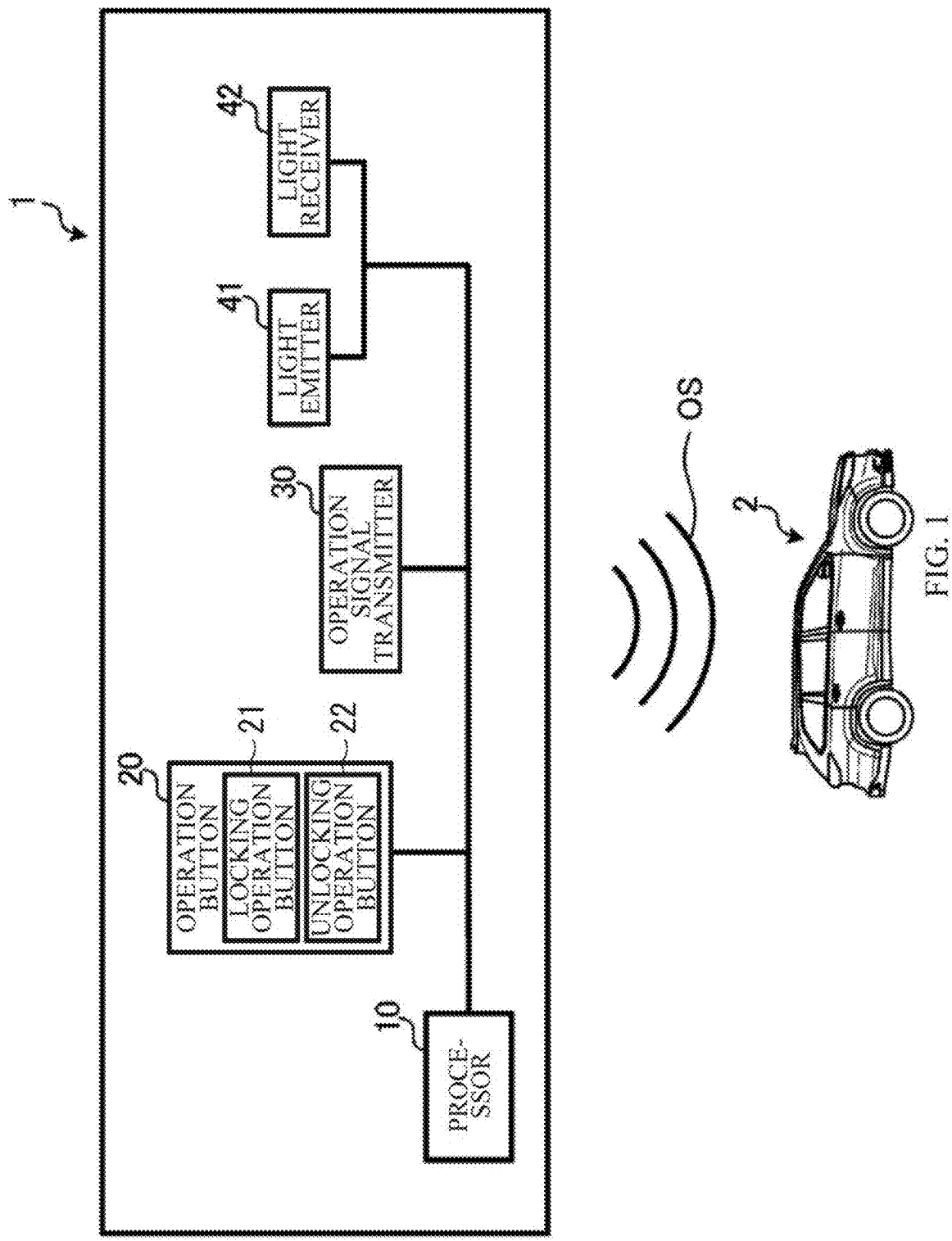
FIG. 1 is a block diagram illustrating an example of a configuration of an electronic key for a vehicle according to one example embodiment of the disclosure.

In order to switch to a transmission stop mode that stops transmission of an operation signal, a technique disclosed in JP-A No. 2003-64918 necessitates, each time, a user to perform a simultaneous pressing operation or a substantially simultaneous pressing operation of a locking operation button and a unlocking operation button, which necessitates time and effort for the user. The same holds true when cancelling the transmission stop mode, which also necessitates time and effort for the user.

Further, even when the transmission stop mode has been set, the transmission stop mode can be cancelled if a user's unintended simultaneous pressing operation is performed on both the locking operation button and the unlocking operation button by some external force, for example, where an electronic key for a vehicle is placed in a pocket of trousers or a bag. Under such circumstances, if the transmission stop mode is cancelled, it is difficult to prevent the unintended erroneous operation of the user.

It is desirable to provide an electronic key for a vehicle which makes it possible to suppress a door locking and a door unlocking of the vehicle resulting from an erroneous operation.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

An electronic key 1 for a vehicle (hereinafter simply referred to as an "electronic key 1") according to an example embodiment of the disclosure may be adapted to a keyless entry system that performs a door locking and a door unlocking of a vehicle 2 by a button operation. In some embodiments, the electronic key 1 may have at least a configuration illustrated in FIG. 1.

The electronic key 1 includes a processor 10. The processor 10 may include: a processor such as a central processing unit (CPU) or a micro processing unit (MPU); an electric circuit; and a storage device such as a random-access memory (RAM) or a read-only memory (ROM). Respective components configuring the electronic key 1 may be configured to transmit and receive a signal or the like via a bus that couples the components to each other. The processor 10 may control an operation button 20, an operation signal transmitter 30, a light emitter 41, and a light receiver 42 that are described later.

The electronic key 1 includes the operation button 20 configured to perform the door locking and the door unlocking of the vehicle 2. The operation button 20 may include a locking operation button 21 and an unlocking operation button 22. A user may operate the locking operation button 21 and the unlocking operation button 22 provided on the electronic key 1 to perform the door locking and the door unlocking of the vehicle 2. The processor 10 may detect an operation of the operation button 20 by receiving an input of unillustrated switches provided in the locking operation button 21 and the unlocking operation button 22. For example, the input of the switch may be performed by the user pressing the operation button 20.

The electronic key 1 includes the operation signal transmitter 30 configured to transmit an operation signal OS, based on the operation performed on the operation button 20. The vehicle 2 may receive the operation signal OS transmitted from the operation signal transmitter 30, and lock or unlock a door of the vehicle 2 based on the received operation signal OS. The processor 10 may instruct the operation signal transmitter 30 to transmit the operation signal OS, based on the detected operation of the operation button 20. For example, when the operation of the unlocking operation button 22 is detected, the processor 10 may cause the operation signal transmitter 30 to transmit the operation signal OS that is based on the unlocking operation.

The electronic key 1 includes the light emitter 41 configured to emit light in response to the operation of the operation button 20 and output the light. The light emitter 41 may include an unillustrated light-emitting circuit, and output the light having signal data when the operation button 20 is operated. In some embodiments, the signal data may be based on a specific blinking pattern or an intensity of light. The signal data may be configured to make it possible to determine that the light received by the later-described light receiver 42 is the light outputted from the light emitter 41. The light to be outputted from the light emitter 41 may be or may include infrared light, although it is not limited thereto. In some embodiments, the light to be outputted from the light emitter 41 may be visible light or any light, as long as the light emitter 41 is able to emit light with the light involving the signal data.

The electronic key 1 includes the light receiver 42. The light receiver 42 may include an unillustrated light-receiving circuit. The light-receiving circuit provided in the light receiver 42 may be adapted to the light-emitting circuit provided in the light emitter 41, and configured to determine whether the received light is the light outputted from the light emitter 41. When determining that the light outputted from the light emitter 41 is received, the light receiver 42 may transmit a light receiving signal to the processor 10. When light other than the light outputted from the light emitter 41 is received, the light receiver 42 may refrain from transmitting the light receiving signal to the processor 10. The light-receiving circuit may be a circuit such as a light-detecting circuit that includes a light-receiving device.

Figure 2:
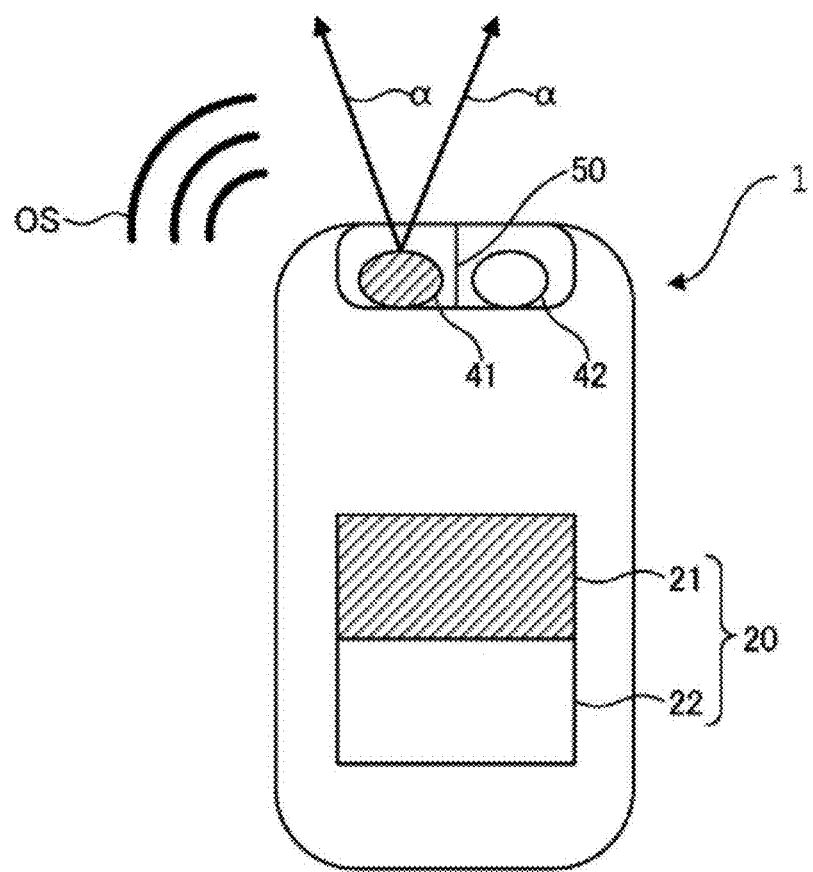
FIG. 2 is an explanatory diagram of an operation of the electronic key for the vehicle illustrated in FIG. 1.

Referring to FIG. 2, a partition wall 50 may be provided between the light emitter 41 and the light receiver 42. The partition wall 50 may be so provided as to prevent the light outputted from the light emitter 41 from directly entering the light receiver 42. The light emitter 41 and the light receiver 42 may be provided at their respective positions that make it difficult for a hand of the user to block the light to be outputted from the light emitter 41 when the user operates the operation button 20. In some embodiments, the light emitter 41 and the light receiver 42 may be provided at their respective positions that are adjacent to an end of the electronic key 1 with the partition wall 50 being interposed therebetween.

Next, an example of an operation of the electronic key 1 will be described with reference to FIGS. 2 and 3.

As illustrated in FIG. 2, the light emitter 41 may emit light first and output light α is outputted when the operation button 20 is operated, following which the operation signal OS may be transmitted from the operation signal transmitter 30. Between the light emission by the light emitter 41 and the transmission of the operation signal OS following the operation of the operation button 20, the light emission of the light emitter 41 may be executed earlier, and the operation signal OS may be transmitted from the operation signal transmitter 30 after a predetermined time has elapsed from the light emission by the light emitter 41. In some embodiments, the predetermined time may be about 0.1 seconds. As described above, the output light α to be outputted at this time may include the signal data that is based on the specific blinking pattern or the intensity of the light.

Figure 3:
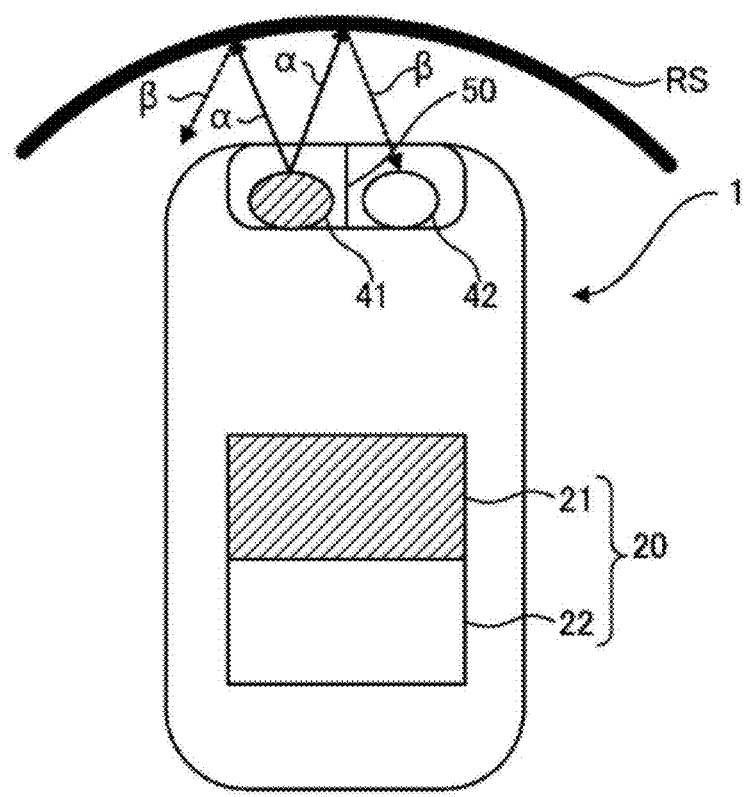
FIG. 3 is an explanatory diagram of an operation of the electronic key for the vehicle illustrated in FIG. 1.

FIG. 3 illustrates an example in which the operation signal OS is prevented from being transmitted from the electronic key 1. FIG. 3 illustrates a state in which the electronic key 1 is in a closed space, e.g., a state in which a reflection surface RS that reflects the output light α outputted from the light emitter 41 is provided in an output direction of the output light α. For example, the closed space may be a space in a bag or in a pocket of trousers, or any other space that has the reflection surface RS.

When the operation button 20 is operated, the light emitter 41 may emit the light and the output light α may be outputted as in the case of FIG. 2. When the output light α hits the reflection surface RS of the closed space, the output light α may be reflected from the reflection surface RS and serve as the reflection light β. As illustrated in FIG. 3, the operation signal OS may not be transmitted from the operation signal transmitter 30 when the light receiver 42 receives the reflection light β. At this time, the reflection light β may have the same signal data as the output light α. When it is determined that the reflection light β is received, the light receiver 42 may transmit the light receiving signal to the processor 10. The processor 10 may refrain from instructing the operation signal transmitter 30 to transmit the operation signal OS when the light receiving signal is received from the light receiver 42.

Referring to FIG. 3, the time from when the output light α is outputted to when the light receiver 42 receives the reflection light β may be within the predetermined time, such as 0.1 seconds. The predetermined time from the output of the output light α to the transmission of the operation signal OS may be provided as a sufficient time from the output of the output light α to the reception of the reflection light β by the light receiver 42 in the closed space. Accordingly, when the light receiver 42 receives the reflection light β within the predetermined time from the output of the output light α, the operation of the operation button 20 at that time may be regarded as an erroneous operation in the closed space other than the intentional operation by the user, refraining from performing the transmission of the operation signal OS.

When the light receiving signal is not received from the light receiver 42, the processor 10 may instruct the operation signal transmitter 30 to transmit the operation signal OS after the predetermined time has elapsed from the output of the output light α. Accordingly, the operation signal OS is prevented from not being transmitted when the light receiver 42 receives any other light that is not the reflection light β.

Figure 4:
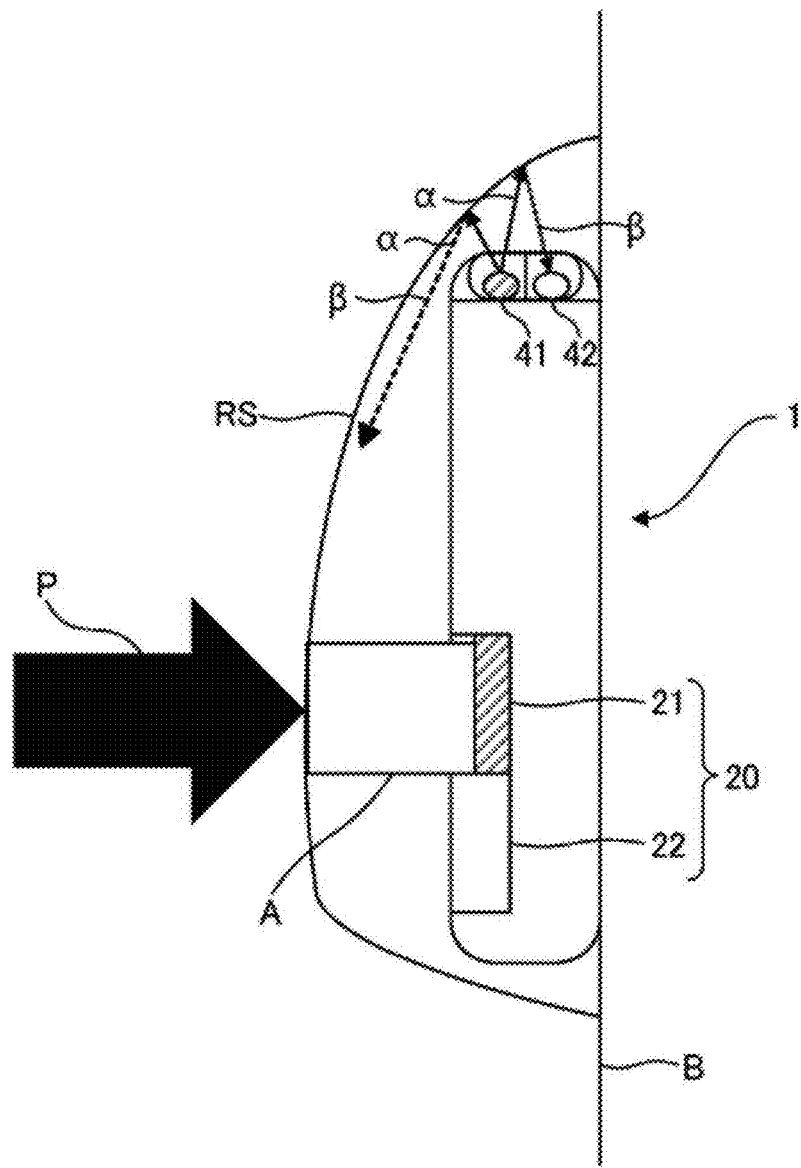
FIG. 4 is a right-side view of the electronic key for the vehicle illustrated in FIG. 1.

Next, an example of the erroneous operation of the electronic key 1 will be described with reference to FIG. 4. FIG. 4 is a right-side view of the electronic key 1 illustrated in FIGS. 2 and 3. It should be noted that the light emitter 41 and the light receiver 42 are illustrated in FIG. 4 for easier understanding.

FIG. 4 illustrates a state in which the electronic key 1 and an object A are put together in a pocket of the trousers. Referring to FIG. 4, the electronic key 1 is disposed between the object A, put together with the electronic key 1 in the closed space, and the body B of the user. Under such circumstances, when an external force P as illustrated by an arrow is applied, the object A can be pushed toward the operation button 20 by the external force P, which can operate the operation button 20 accordingly.

The light emitter 41 emits light and the output light α is outputted when the operation button 20 is operated by the object A. When the thus-outputted output light α hits the reflection surface RS of the closed space, e.g., hits an inner side of the trousers, the output light α is reflected from the reflection surface RS and serves as the reflection light β. The operation signal OS is not transmitted by the operation signal transmitter 30 when the light receiver 42 receives the reflection light β as illustrated in FIG. 4. Thus, the operation signal OS is not transmitted when the operation of the operation button 20 is performed in the closed space other than by the user. The configuration according to the example embodiment helps to suppress the door locking and the door unlocking of the vehicle 2 which are not intended by the user resulting from the erroneous operation.

Even when the electronic key 1 is in the pocket of the trouser alone, the operation signal OS is not transmitted also when the external force P is applied to directly operate the operation button 20 from the outside of the closed space without the presence of the object A. The configuration according to the example embodiment likewise helps to suppress the door locking and the door unlocking of the vehicle 2 which are not intended by the user resulting from the erroneous operation.

Figure 5:
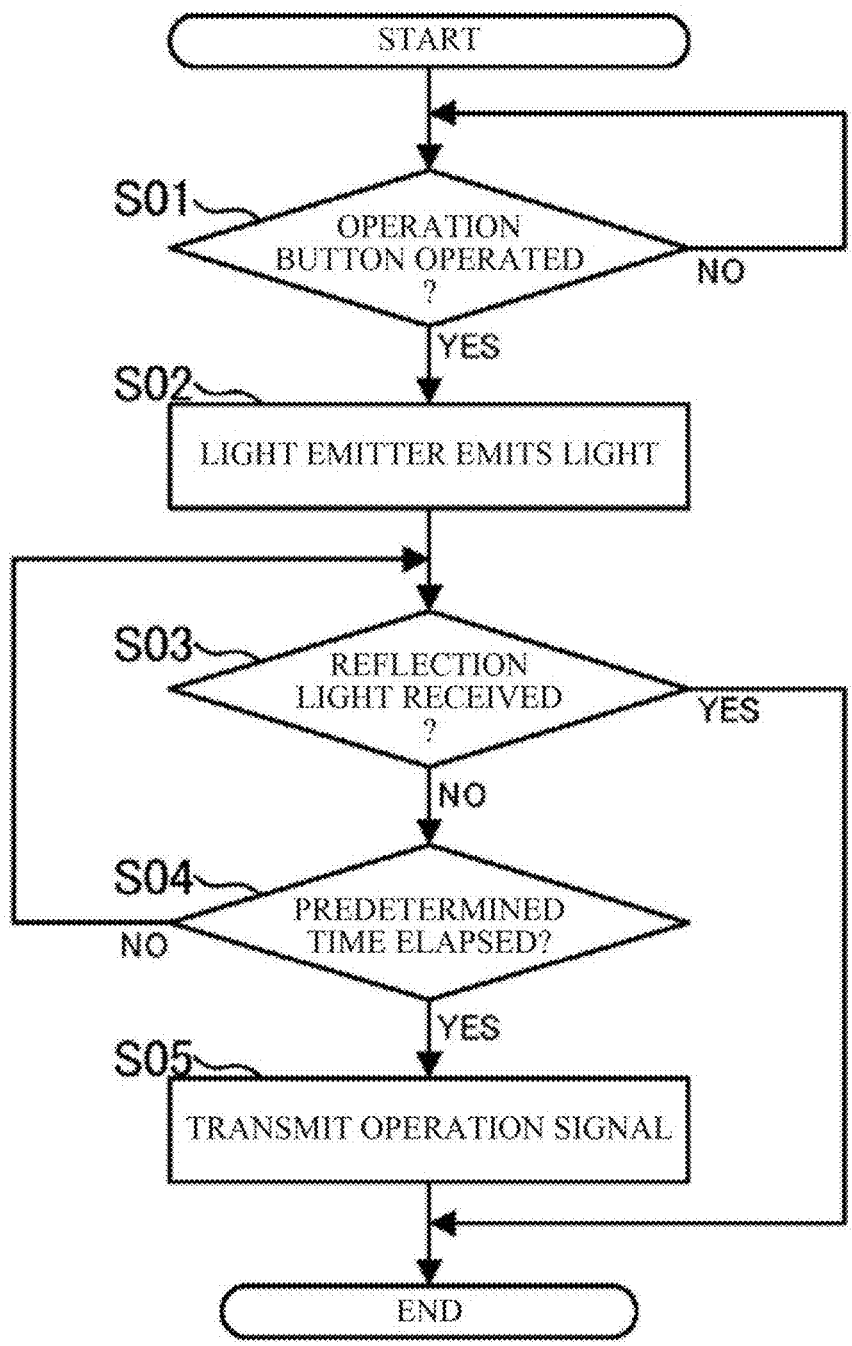
FIG. 5 is a control flowchart illustrating an example of a process to be performed by the electronic key for the vehicle illustrated in FIG. 1.

Next, an example of a control flow of the electronic key 1 will be described with reference to FIG. 5.

In step S01, the processor 10 may monitor the operation of the operation button 20. The operation of the operation button 20 may be monitored by detecting the inputs of the switches of the locking operation button 21 and the unlocking operation button 22. The processor 10 may determine that the operation of the operation button 20 is performed when the input of the switch of the locking operation button 21 or the unlocking operation button 22 is detected. If the processor 10 determines that the operation button 20 is operated (step S01: YES), the processor 10 may transmit a light emission instruction to the light emitter 41. In step S02, the light emitter 41 may emit light and output the output light α that includes the signal data. The operation of the operation button 20 may be monitored by the processor 10 until the operation of the operation button 20 is detected (step S01: NO).

When the light emitter 41 emits the light, the processor 10 may determine whether the light receiver 42 has received the reflection light β. For example, in step S03, the processor 10 may stand by for the reception of the light receiving signal from the light receiver 42. If the light receiving signal is received from the light receiver 42, the processor 10 may determine that the light receiver 42 has received the reflection light β (step S03: YES). When the processor 10 determines that the light receiver 42 has received the reflection light β, the process may be ended without issuing an instruction to transmit the operation signal OS.

If the processor 10 does not determine that the light receiver 42 has received the reflection light β (step S03: NO), in step S04, the processor 10 may count to determine whether the predetermined time has elapsed with the light receiver 42 not receiving the reflection light β. If the predetermined time has not elapsed (step S04: NO), the process may return to step S03. If the predetermined time has elapsed with the light receiver 42 not receiving the reflection light β (step S04: YES), in step S05, the processor 10 may instruct the operation signal transmitter 30 to transmit the operation signal OS that is based on the operation of the operation button 20, and the operation signal transmitter 30 may transmit the operation signal OS in accordance with the instruction. The series of processes may end when the operation signal OS is transmitted by the operation signal transmitter 30. When the processes end, the processor 10 may start the processes again, and monitor the operation of the operation button 20.

As described above, the predetermined time may be provided from the operation of the operation button 20 to the transmission of the operation signal OS. In addition, whether the operation of the operation button 20 is the operation in the closed space may be determined based on the light reception of the reflection light β by the light receiver 42. This configuration helps to detect the erroneous operation of the operation button 20 and to suppress the door locking and the door unlocking of the vehicle 2 which are not intended by the user resulting from the erroneous operation.

In the example embodiment described above, the light emitter 41 and the light receiver 42 may be provided at the end of the electronic key 1. In some embodiments, the light emitter 41 and the light receiver 42 may be provided at positions other than the end of the electronic key 1, as long as the light emitter 41 and the light receiver 42 are provided at their respective positions that make it difficult for the hand of the user which grasps the electronic key 1 to block the output light α when the user operates the operation button 20.

Next, an electronic key 1A for a vehicle according to a modification example will be described with reference to FIG. 6. The electronic key 1A according to the present modification example may include the multiple light emitters 41 and the multiple light receivers 42. The electronic key 1A may include: the light emitter 41 provided, in addition to the end of the electronic key 1A, on a surface on which the operation button 20 is provided, and output light in a different direction from the light emitter 41 provided at the end; and the light receiver 42. In the present modification example, the light emitter 41 and the light receiver 42 provided at the end of the electronic key 1A are respectively referred to as a first light emitter 411 and a first light receiver 421. The light emitter 41 and the light receiver 42 provided on the surface on which the operation button 20 is provided are respectively referred to as a second light emitter 412 and a second light receiver 422. The output light α to be outputted from the first light emitter 411 is referred to as first output light α1, and the output light α to be outputted from the second light emitter 412 is referred to as second output light α2. Other configurations of the electronic key 1A may be the same as or similar to those of the electronic key 1 according to the example embodiment.

Figure 6:
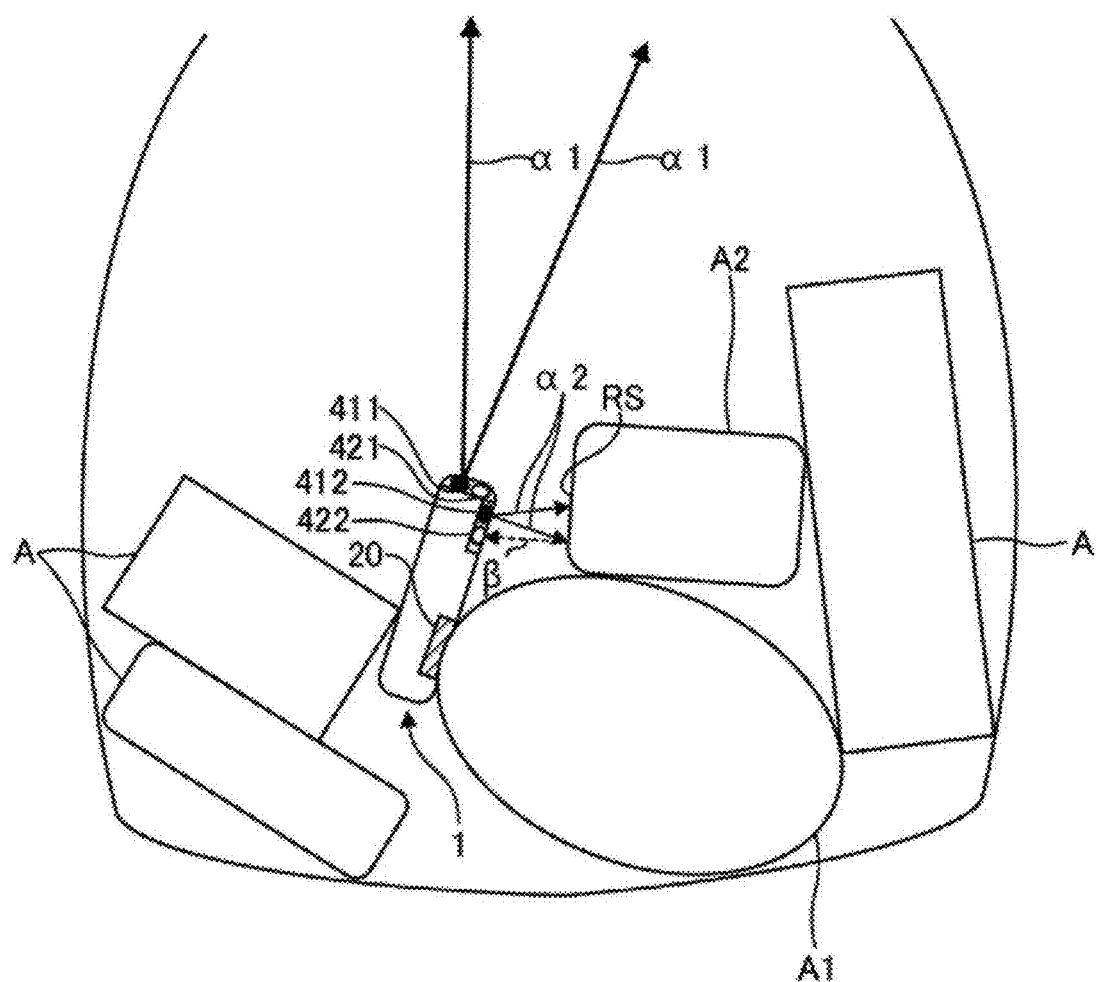
FIG. 6 is a diagram illustrating the electronic key for the vehicle according to a modification example.

FIG. 6 illustrates an example state in which the electronic key 1A is in a bag having an opening adapted to take out the object A, e.g., a state in which the electronic key 1A is in a closed space in which the reflection surface RS is partially not provided.

In the closed space illustrated in FIG. 6, the multiple objects A may be positioned adjacent to the electronic key 1A. In the present modification example, the object A that can operate the operation button 20 of the electronic key 1A is referred to as an object A1. When the operation button 20 is operated by the object A1, the first light emitter 411 and the second light emitter 412 may emit light and respectively output the first output light α1 and the second output light α2.

The first output light α1 may travel straight toward the opening of the bag as illustrated in FIG. 6 when the first output light α1 is outputted. No reflection of the first output light α1 occurs because the reflection surface RS does not exist in the output direction of the first output light α1. In contrast, the second output light α2 outputted from the second light emitter 412 in a different direction from the first output light α1 may hit the reflection surface RS and reflected as the reflection light β, because the object A2 is disposed in the output direction of the second output light α2 and an outer surface of the object A2 serves as the reflection surface RS.

The reflection light β may enter the second light receiver 422, and the second light receiver 422 may receive the reflection light β. When the reflection light β is received, the second light receiver 422 may transmit the light receiving signal to the processor 10. The processor 10 may refrain from instructing the operation signal transmitter 30 to transmit the operation signal OS when the light receiving signal is received.

The electronic key 1A that has the multiple light emitters 41 and the multiple light receivers 42 and outputs the output light α in different directions from each other helps to detect the erroneous operation and to suppress the door locking and the door unlocking of the vehicle 2 which are not intended by the user resulting from the erroneous operation, even when the operation button 20 is operated in the closed space in which the reflection surface RS is not partially provided as illustrated in FIG. 6.

The example embodiment described above may be directed to the suppression of the door locking and the door unlocking of the vehicle 2 resulting from the erroneous operation of the operation button 20. In some embodiments, the erroneous operation of the unlocking operation button 22 is to be suppressed from, for example, the viewpoint of providing for the theft of the vehicle 2. In terms of providing for the theft, the unlocking of the vehicle 2 resulting from the erroneous operation involves a risk; however, the locking of the vehicle 2 is not problematic. Accordingly, in some embodiments, the light emitter 41 may not emit light when the locking operation button 21 is operated, and the light emitter 41 may emit light when the unlocking operation button 22 is operated. This configuration helps to suppress the door unlocking resulting from the erroneous operation.

At least one embodiment of the disclosure helps to determine that an operation performed on an operation button is an erroneous operation when an operation of the operation button unintended by a user is performed and to suppress a door locking and a door unlocking of a vehicle resulting from the erroneous operation, where an electronic key for the vehicle is in, for example, a pocket of trousers, a bag, or the like.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

The processor 10 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processor 10. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the processor 10 illustrated in FIG. 1.

The invention claimed is:

1. An electronic key for a vehicle, the electronic key comprising:
   an operation button configured to perform a door locking and a door unlocking of the vehicle;
   an operation signal transmitter configured to transmit an operation signal, based on an operation performed on the operation button;
   a light emitter configured to output light, in response to the operation of the operation button;
   a light receiver configured to receive reflection light of the light outputted from the light emitter; and
   a processor configured to refrain from causing the operation signal transmitter to transmit the operation signal that is based on the operation of the operation button, when the light receiver receives the reflection light.

2. The electronic key for the vehicle according to claim 1, wherein
   the light to be outputted from the light emitter comprises signal data, and
   the light receiver is configured to determine that the reflection light of the light outputted from the light emitter is received, when the light receiver receives the light comprising the signal data.

3. The electronic key for the vehicle according to claim 1, wherein the light emitter and the light receiver are provided at their respective positions that make it difficult for a hand of a user to block the light to be outputted from the light emitter when the user operates the operation button.

4. The electronic key for the vehicle according to claim 3, wherein
   the light emitter comprises multiple light emitters, and
   the light receiver comprises multiple light receivers.

* * * * *